C. ANDERSEN.
MOTION PICTURE MACHINE.
APPLICATION FILED AUG. 9, 1915.

1,246,217.

Patented Nov. 13, 1917.

WITNESSES:
Adolph W. Harr.
Alta M. Dalton.

INVENTOR
Christian Andersen

UNITED STATES PATENT OFFICE.

CHRISTIAN ANDERSEN, OF PORTLAND, OREGON.

MOTION-PICTURE MACHINE.

1,246,217.  Specification of Letters Patent.  Patented Nov. 13, 1917.

Application filed August 9, 1915. Serial No. 44,603.

*To all whom it may concern:*

Be it known that I, CHRISTIAN ANDERSEN, a citizen of the United States, residing in the city of Portland, county of Multnomah, and State of Oregon, have invented certain new and useful Improvements in Motion-Picture Machines, of which the following is a specification.

My invention relates to motion picture machines, and more particularly to that class of moving picture machines in which a picture film is driven continuously and uniformly, and in which a movably mounted reflector, with means for oscillating the same, is utilized to compensate for the interval of time necessary to change pictures, instead of intermittently stopping the film, said reflector being moved in synchronism with the moving film.

The principal object of my invention is to provide an improved structure in which it is possible to make certain adjustments of the reflector bodily relative to the picture film, and also to change the reflector-operating mechanism so as to regulate the oscillating movement of the reflector, which movement must necessarily be changed with each change of position of the reflector.

So far as I am aware, I am the first to mount an oscillating reflector so that it can be adjusted relative to the film, thus enabling me to regulate the distance between the reflector and the film, which is absolutely necessary in order to get results. This adjustment requires a change in the oscillating movement of the reflector, which oscillating movement depends upon its distance from the film. In other words, the closer the reflector is to the film, the greater must its angle of oscillation be, and as the reflector is moved away from the film, its angle of oscillation is proportionately reduced.

In order that others may understand my invention I have illustrated the same in the accompanying sheet of drawings which I will now describe.

Figure 1:
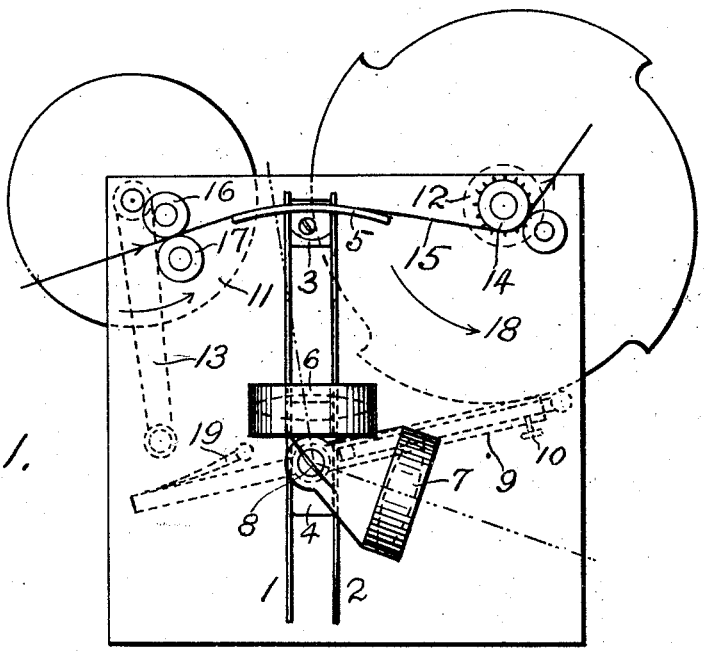
Figure 1 is a side elevation of a machine embodying my invention.

In the drawings here shown for purposes of illustration, I have shown the reflector mounted between the lens elements, but it is to be understood that the lens elements may be mounted together in the same barrel, similar to the illustration in the drawings of my co-pending application filed June 21, 1915, Serial Number 35,313.

I will now describe more in detail the illustration intended to indicate one form of structure embodying my invention. In the drawings 1 and 2 designate guide members between which are movably mounted blocks 3 and 4, which can be moved up and down to different positions as required. Block 3 carries a picture film guide 5, while block 4 carries the two lenses 6 and 7, a reflector 8, an operating lever 9, having an extension, or cam-engaging portion, adapted to be held in various extended positions by means of a set screw 10, as will be clearly understood from the drawing. 11 and 12 designate two pulleys adapted to be connected by means of a belt (not shown), the pulley 11, being driven by crank 13. A sprocket 14, mounted upon the same shaft with the pulley 12, moves the picture film 15, which is guided between two rollers 16 and 17, over the picture film guide 5. An operating cam 18, is also mounted upon and driven by the same shaft upon which the pulley 12 and the sprocket 14 are mounted, said cam being adapted to operate the lever, or arm, 9, for rocking or oscillating the reflector 8. As the block 4, which carries the reflector 8, and the lenses 6 and 7 are adjusted up and down in the guide members 1 and 2, the extension of the cam lever 9, is also adjusted in order to maintain the proper relationship between the distance from the reflector to the film, and the distance from the reflector to the point of tangency, or to the point of engagement of the operating arm, on the periphery of the operating cam. This adjustment of the operating lever 9, controls the oscillating movement of the reflector. A spring 19, operates upon the opposite end of the operating lever 9, for holding its operating end yieldingly in engagement with the cam 18.

Figure 2:
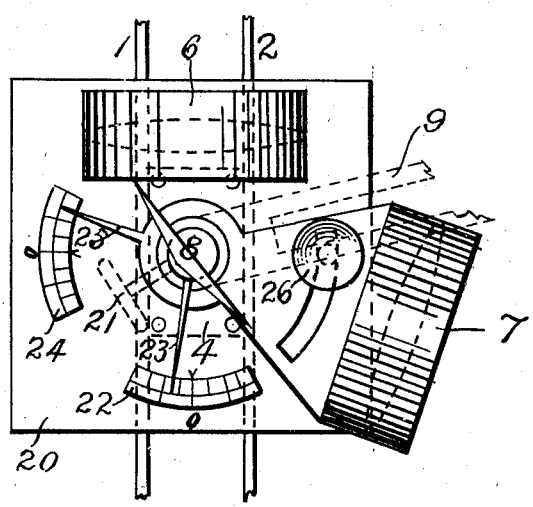
Fig. 2 is an enlarged detail view.

Referring to Fig. 2, a plate may be mounted upon the block 4, at the side of the guide members 1 and 2, for supporting the lenses 6 and 7, the lens 7 being adjustably mounted upon the shaft which carries the reflector 8, and being adapted to be held in different adjusted positions as by means of a thumb screw 26, as will be clear from the illustration. The shaft which carries the reflector 8, can be adjusted relative to the lever 9, by means of a set screw 21, for controlling the general direction from which the pictures are to be reflected. A dial 22, and an indicator finger 23, may be used to show the relative positions of the shaft and reflector, and the dial 24 with an indicator finger 25, may be used to show the corresponding position of the lens 7. For example, if the indicator finger 25 is adjusted to the zero position of the dial 24, the pictures are reflected in horizontal direction. If the reflector shaft is clamped to the lever in a position so that the finger 23 indicates zero position on the dial 22, the reflector is adjusted to 45 degrees relative to the horizontal.

I have only shown those parts of one type of machine to which my invention is applicable which are necessary to illustrate the invention, realizing that the invention is applicable not only to a projecting machine, but to cameras as well. Wherever I have used the word "reflector", it is intended to apply to any kind of a reflecting device. My invention can be used with or without a shutter.

I do not, therefore, limit my invention to the particular embodiment here shown for purposes of illustration, or to any particular type of machine, except as I may be limited by the hereto appended claims forming a part hereof.

I claim:

1. In combination with a film and means for continuously driving the same, a lens adjustably mounted with relation to the film, a reflector adjustably mounted to be moved bodily to and from said film, means for oscillating said reflector in synchronism with the movement of said film, said means being adapted to be regulated to change the oscillating movement of said reflector according to its different positions relative to said film.

2. In combination with a film and means for continuously driving the same, a lens adjustably mounted with relation to the film, a reflector adjustably mounted to be moved bodily to and from said film, an operating cam, an operating lever for oscillating said reflector, said lever having an adjustable cam-engaging part, whereby, as said reflector is adjusted to and from said film, said operating lever can also be adjusted to control the oscillating movement of said reflector.

3. In combination with means for supporting and guiding a film, and for continuously driving the same, a reflector movably mounted to be adjusted bodily to and from said film, said reflector being also mounted to be oscillated, a lens adjustably mounted relative to said reflector and to the film and means for oscillating said reflector in synchronism with the movement of said film, said means being capable of adjustment, whereby to regulate the oscillating movement of said reflector according to its distance from said film.

4. In a device of the character referred to, in combination, a film guide adjustably mounted, means for continuously driving a film along said film guide, a reflector mounted to be adjusted bodily to and from said film guide, said reflector being also adapted to be oscillated, a lens mounted to be adjusted relative to said reflector and to the film, and means for oscillating said reflector in synchronism with the movement of said film, said means being capable of adjustment, whereby to regulate the oscillating movement of said reflector according to its distance from said film.

5. In a device of the character referred to, in combination, a film guide, means for moving a film therealong continuously, a pair of lens elements adjustably mounted to be be moved bodily to and from said film guide, a reflector mounted to oscillate between said lens elements and movable bodily therewith in their adjustment to and from said film guide, and means for oscillating said reflector in synchronism with the movement of said film, said means being capable of adjustment, whereby to regulate the oscillating movement of said reflector according to its distance from said film.

6. In a device of the character referred to, in combination, a film guide, means for moving a film therealong continuously, a pair of bodily adjustable lens elements mounted at an angle to each other, one of said lens elements being adjusted relative to the other, a reflector mounted to oscillate between said lens elements and movable bodily therewith in their adjustment to and from said film guide, and means for oscillating said reflector in synchronism with the movement of said film, said means being capable of adjustment, whereby to regulate the oscillating movement of said reflector according to its distance from said film.

7. In a device of the character referred to, in combination, a film guide adjustably mounted, means for continuously driving a film along said film guide, a reflector mounted to be adjusted bodily to and from said film guide, said reflector being also adapted to be oscillated, a lens mounted to be adjusted relative to said reflector and to the film, and means for oscillating said reflector in synchronism with the movement of said film, said means comprising an operating cam, and an operating lever extending from said reflector to said cam, said lever having an adjustable cam-engaging portion whereby to regulate the oscillating movement of said reflector according to its distance from said film guide.

8. In a device of the character referred to, in combintion, a film guide, means for moving a film therealong continuously, a pair of bodily adjustable lens elements mounted to be adjusted bodily to and from said film guide, a reflector mounted to oscillate between said lens elements and movable bodily therewith in their adjustment to and from said film guide, and means for oscillating said reflector in synchronism with the movement of said film, said lever having an adjustable cam-engaging portion whereby to regulate the oscillating movement of said reflector according to its distance from said film guide.

9. In a device of the character referred to, in combination, a film guide, means for moving a film therealong continuously, a pair of lens elements adjustably mounted in relation to the film, and at an angle to each other, one of said lens elements being adjustable relative to the other, a reflector mounted to oscillate between said lens elements and movable bodily therewith in their adjustment to and from said film guide, and means for oscillating said reflector in synchronism with the movement of said film, said lever having an adjustable cam-engaging portion, whereby to regulate the oscillating movement of said reflector according to its distance from said film guide.

10. In a device of the character referred to, in combination with a picture film and means for continuously moving the same, a reflector adjustably mounted and provided with an indicating finger and dial for indicating its angular position of adjustment, a lens adjustable relative to said reflector and provided with an indicating finger and dial for indicating its position relative to the horizontal, means for changing the distance between said film and said lens, and means for oscillating said reflector, said means being adjustable whereby to change its movement of oscillation.

11. In a device of the character referred to, in combination with a picture film and means for continuously moving the same, a film guide adjustably mounted, a reflector mounted at an angle to said film guide, said reflector being adapted to be oscillated about its axes, means for oscillating said reflector, said means being adjustable whereby to change the angle and distance of oscillation of said reflector, and a lens adjustably mounted, whereby to be adjusted to different positions relative to said reflector, substantially as described.

12. In a device of the character referred to, in combination with a picture film and means for continuously moving the same, a film guide, a lens, a reflector, means for oscillating said reflector in synchronism with the movement of said film, said means being capable of adjustment, whereby to regulate the oscillating movement of said reflector according to its distance from said film, and means for changing the distance between said film guide and said lens and reflector.

Signed at Portland, in the county of Multnomah, and State of Oregon.

CHRISTIAN ANDERSEN.

Witnesses:
  ADOLPH W. HARR,
  ALTA M. DALTON.